US012460433B2

(12) United States Patent
Dai

(10) Patent No.: US 12,460,433 B2
(45) Date of Patent: Nov. 4, 2025

(54) SCAFFOLD SAFETY DEVICE AND MONITORING SYSTEM

(71) Applicant: IQM Systems Pty Ltd, Prestons (AU)

(72) Inventor: Penglei Dai, Prestons (AU)

(73) Assignee: IQM Systems Pty Ltd, Prestons (AU)

( * ) Notice: Subject to any disclaimer, the term of this patent is extended or adjusted under 35 U.S.C. 154(b) by 112 days.

(21) Appl. No.: 18/557,761

(22) PCT Filed: Apr. 29, 2022

(86) PCT No.: PCT/AU2022/050401
§ 371 (c)(1),
(2) Date: Oct. 27, 2023

(87) PCT Pub. No.: WO2022/226602
PCT Pub. Date: Nov. 3, 2022

(65) Prior Publication Data

US 2024/0218679 A1 Jul. 4, 2024

(30) Foreign Application Priority Data

Apr. 29, 2021 (AU) ................................ 2021901266

(51) Int. Cl.
*E04G 5/00* (2006.01)
*G08B 21/18* (2006.01)
(Continued)

(52) U.S. Cl.
CPC ........... *E04G 5/001* (2013.01); *G08B 21/182* (2013.01); *E04G 5/046* (2013.01); *E04G 7/14* (2013.01)

(58) Field of Classification Search
CPC ........... E04G 5/001; E04G 5/046; E04G 7/14; G08B 21/182
(Continued)

(56) References Cited

U.S. PATENT DOCUMENTS 9,483,674 B1 * 11/2016 Fink .................. G06K 7/10366
10,331,806 B2 * 6/2019 Grassa ...................... E04G 5/10
(Continued)

FOREIGN PATENT DOCUMENTS

WO 2021/072499 A1 4/2021

OTHER PUBLICATIONS

PCT International Search Report for corresponding International Application Serial No. PCT/AU2022/050401, mailed Jun. 27, 2022, pp. 1-3.

*Primary Examiner* — Zhen Y Wu
(74) *Attorney, Agent, or Firm* — Tarolli, Sundheim, Covell & Tummino LLP

(57) ABSTRACT

A scaffold safety device (120) has a body (122) having an engagement formation (124) configured to engage with an element (20, 72) of a scaffold assembly (10). The device (120) also has a pressure sensor (126) configured to detect when the body is disengaged from the scaffold assembly. The engagement formation includes first and second arms (128, 130) extending away from the body. The arms are separated by a cavity (134). The cavity is configured to receive a threaded rod and a tightening nut (135) of the scaffold assembly. The pressure sensor is included on one arm (128) and is configured to detect when a pressure attains a predetermined threshold value. The pressure sensor is in communication with a control board (86) which is connected to an antenna (140) on a secondary scaffold safety device (142).

8 Claims, 18 Drawing Sheets

(51) Int. Cl.
*E04G 5/04* (2006.01)
*E04G 7/14* (2006.01)

(58) Field of Classification Search
USPC ........................................................ 340/573.1
See application file for complete search history.

(56) References Cited

U.S. PATENT DOCUMENTS

| | | | | |
|---|---|---|---|---|
| 10,851,872 | B2 * | 12/2020 | Ballarin | F16B 2/18 |
| 2013/0186951 | A1 * | 7/2013 | Zhu | F16B 31/02<br>235/375 |
| 2017/0256105 | A1 * | 9/2017 | Lopes | B60B 27/065 |
| 2023/0220868 | A1 * | 7/2023 | Reiterer | F16B 37/00<br>411/8 |
| 2024/0159067 | A1 * | 5/2024 | Mekuri | G08B 21/02 |

* cited by examiner

SCAFFOLD SAFETY DEVICE AND MONITORING SYSTEM

TECHNICAL FIELD

The present invention relates to scaffold safety devices and to scaffold safety monitoring system. In particular, the present invention relates to scaffold safety devices for use in a scaffold safety monitoring system operating in multi-storey residential and commercial construction projects.

BACKGROUND OF THE INVENTION

In multi-storey construction projects, a scaffold is typically located around the perimeter of a new building or maintenance site. The scaffold enables workers to work on the external structures and surfaces in a controlled environment, with reduced risk of injury from falling, whilst being protected from falling objects. In addition, the scaffold provides an easy way to access the building externally for workers and materials before the internal access points have been completed. In addition, the scaffold can be used to prevent unauthorised access to the site, and provides other advantages, such as dust control.

As the height of the scaffold increases, there is an increasing risk of the scaffold collapsing. This is due to the limited structural strength of the scaffold, and the increased load placed on the scaffold due to its own weight as the height increases.

In order to improve the strength and stiffness of the scaffold, in addition to rakers and diagonal bracing, the scaffold is anchored or attached intermittently to the building structure under construction at predetermined locations, such as with wall ties. This greatly improves the strength of the scaffold, and significantly reduces the likelihood of a catastrophic failure. However, the wall attachment points can be problematic at certain times in the construction cycle. For example, when certain tradespeople wish to work at or near the location on the building facade where the scaffold is anchored, it is common for the attachment points to be in the way, dictating that they must be decoupled to enable work to be completed. The decoupling and subsequent recoupling of a wall tie attachment point of the scaffold is permissible within reason, but cannot be undertaken by any tradesperson on the site. In practice, such a task should be done with the permission of the site manager and/or scaffold contractor, to minimise the time period of the interruption, and to minimise the number of attachment points that are affected so as to ensure that the overall integrity of the scaffold is not compromised.

However, due to the large number of independent tradespeople who may be working on a construction site at any given time, there is scope for dangerous situations to arise where workers, without permission, decouple the wall tie attachment points, and may even tamper with the rakers and with the couplers which clamp the bracing and other scaffolding parts together, and without an understanding of the potential consequences. There have been instances in Australia, and also overseas, in which large scaffolds have collapsed due to unauthorised decoupling of a number of attachment points. Such collapses have resulted in death and serious injury.

Prior art anti-tampering devices for scaffolds have been proposed which use proprietary locks that are fitted around the coupler nut, to prevent unauthorised loosening of the wall ties and clamps, as the coupler nut is shielded and unable to be accessed for engagement with a spanner in the normal manner required for removal or adjustment. These prior art anti-tampering devices are typically removed from around the nut by a special tool or key, so that it will not be possible or at least very difficult for an unauthorised person to remove the device without the special tool or key. However, whilst such devices may be able to reduce the risk of tampering, they are time consuming to fit and to remove, which adds to the cost of installing and removing a scaffold. Furthermore, in the event of tampering, it is unlikely that the site manager or scaffold contractor will become aware of the tampering event for a considerable period of time.

SUMMARY OF INVENTION

It is an object of the present invention to overcome or at least substantially ameliorate one or more of the above disadvantages, or to provide a useful alternative.

According to the present invention, there is provided a scaffold safety device comprising a body having an engagement means configured to engage with an element of a scaffold assembly, and a sensor configured to detect when the body is disengaged from the scaffold assembly.

The engagement means preferably includes first and second arms extending away from the body, the arms being separated by a clearance, the clearance being configured to receive a threaded rod and a tightening nut of the scaffold assembly.

Preferably at least one of the first and second arms and/or a portion of the body located between the arms include a pressure sensor configured to detect when a pressure attains a predetermined threshold value.

The pressure sensor is preferably in communication with a control board which is connected to an antenna.

The control board is preferably powered by a battery.

A depression is preferably formed in a side of the body for nesting against and receiving a portion of the scaffold assembly.

The pressure sensor is preferably an electrical conductivity sensor.

Preferably, the electrical conductivity sensor cooperates with a pushbutton pressure switch.

According to another aspect of the present invention, there is provided a method of using a scaffold safety device to detect tampering with a scaffold assembly, the device including a body having an engagement formation defined by first and second arms extending away from the body, the arms being separated by a clearance which is configured to engage with a threaded rod and a tightened nut of the scaffold assembly, the method including the steps of:

- locating the scaffold safety device over the threaded rod and tightened nut of the scaffold assembly,
- activating a trigger of the device by pressing a pressure sensor against a structural element of the scaffold assembly, the structural element being located on or adjacent to the threaded rod and tightened nut, and
- activating an alarm if the pressure sensed by the pressure sensor attains a predetermined threshold value.

The method preferably includes the step of sending one or more electronic messages by SMS notification and/or email to one or more recipients recorded in a database in response to the pressure sensed by the pressure sensor attaining the predetermined threshold value.

There has been thus outlined, rather broadly, the more important features of one aspect of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other structures, assemblies, method steps and system configurations for carrying out the objects of the present invention. It is important, therefore, that the broad outline of the invention described above be regarded as including such equivalent features insofar as they do not depart from the spirit and scope of the present invention.

BEST MODE OF CARRYING OUT THE INVENTION

Figure 1:
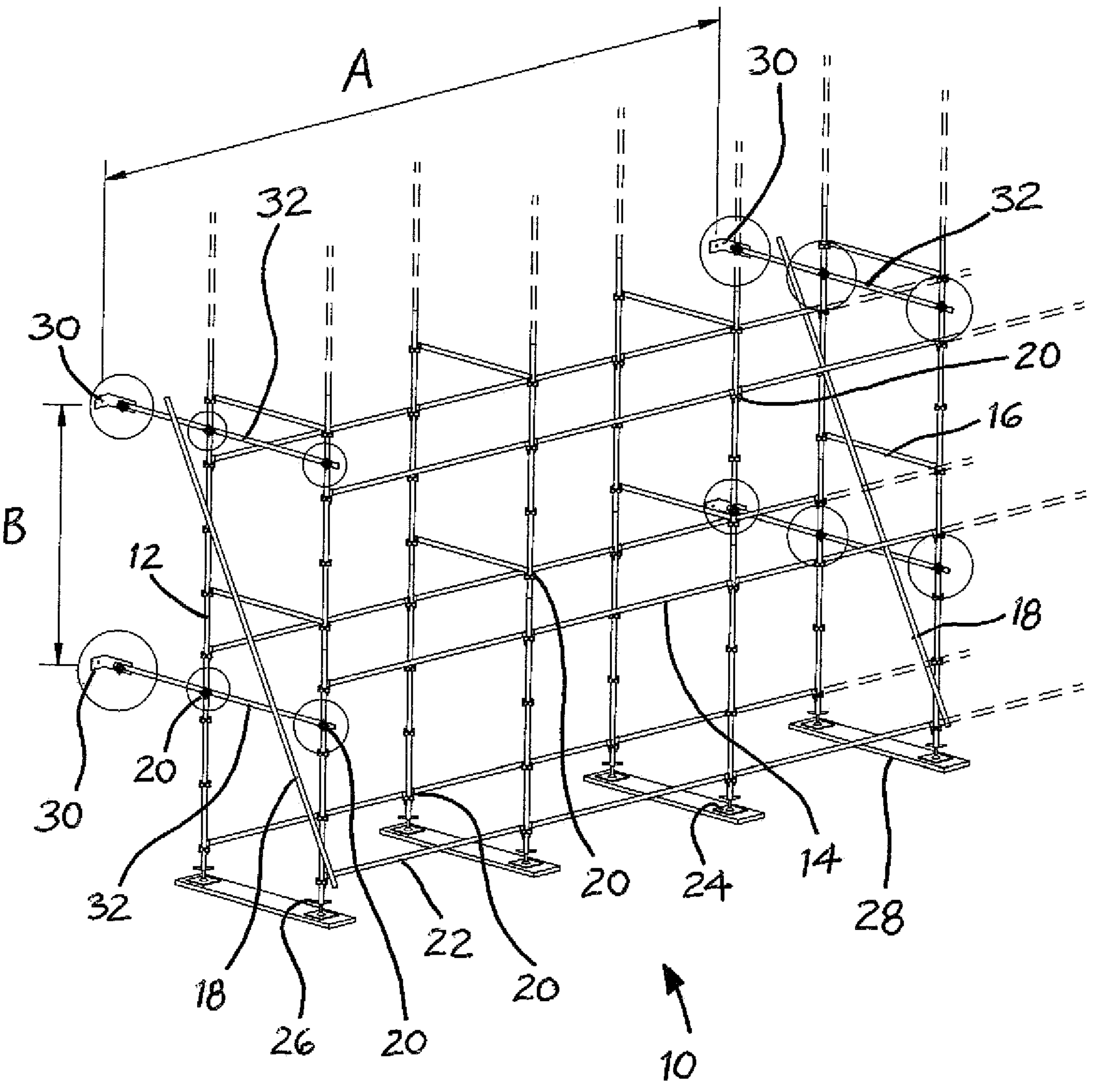
FIG. 1 is a perspective view of a section of a scaffold showing the points of attachment between a wall of a building under construction and the scaffold.

The scaffold 10 shown (in part) in FIG. 1 includes typical scaffolding components, such as standards (posts) 12, ledgers (runners) 14, bearers 16, transverse bracing 18, couplers 20, kicker lifts 22, base plates 24, base jacks 26, sole boards (sills) 28, wall tie brackets 30 and clamped tie bracing tubes 32.

Figure 2:
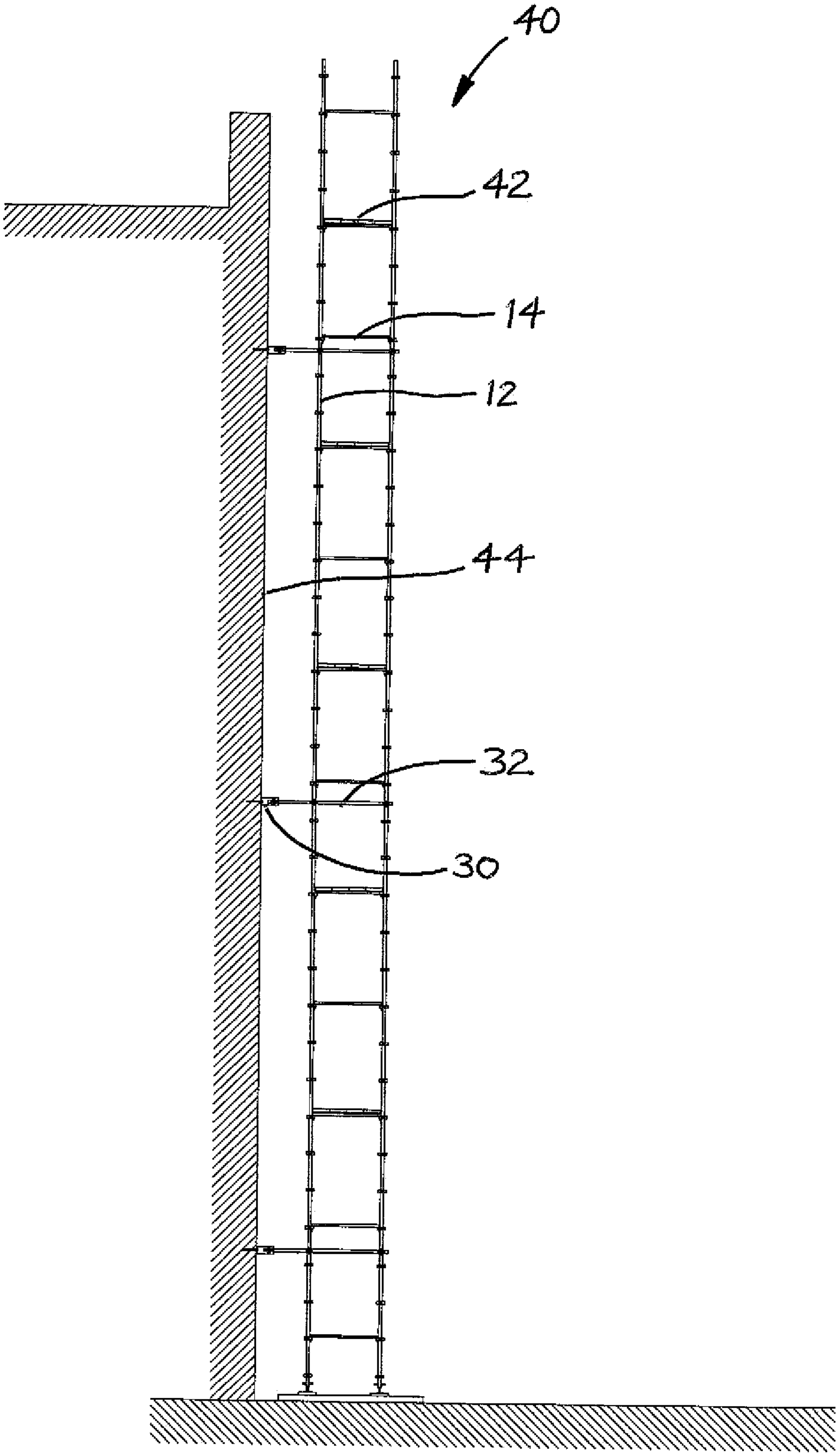
FIG. 2 is a side view of another scaffold showing wall ties attaching the scaffold to a wall of a building under construction.

The scaffold 10, like the scaffold 40 shown in FIG. 2, may also include platforms 42, and is anchored or attached to an external wall 44 of a building structure under construction at predetermined locations (as determined by relevant Building Standards) separated by a horizontal distance A and by a vertical distance B. The attachments to the wall 44 are by means of the wall tie brackets 30 and clamped tie bracing tubes 32 so as to improve the strength and stiffness of the scaffold.

The circled portions of the scaffold 10 shown in FIG. 1 are the locations of most importance in ensuring that the scaffold is secured reliably and safely to the wall 44. The scaffold safety devices of the present invention can be engaged to all of the circled locations but, ideally, they are only engaged to the first two circled locations nearest the wall 44. The scaffold safety devices of the present invention are to be engaged to cover and protect several of the attachment points of the wall tie brackets 30 and clamped tie bracing tubes 32 which are vulnerable to unauthorised tampering, as will be described in more detail later in this specification.

Figure 3:
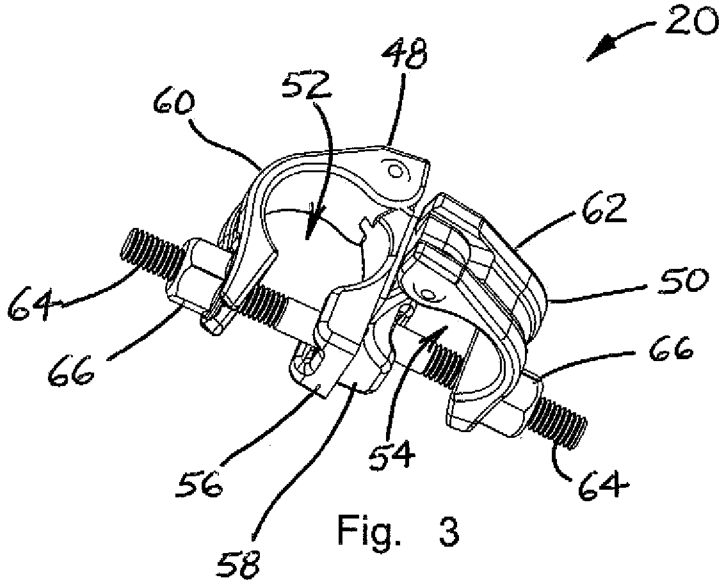
FIG. 3 is a perspective view of a coupler formed of a pair of integrally joined clamps which may be used in the installation of a scaffold, the operational integrity of which may be monitored by the safety devices of the present invention.
Figure 4:
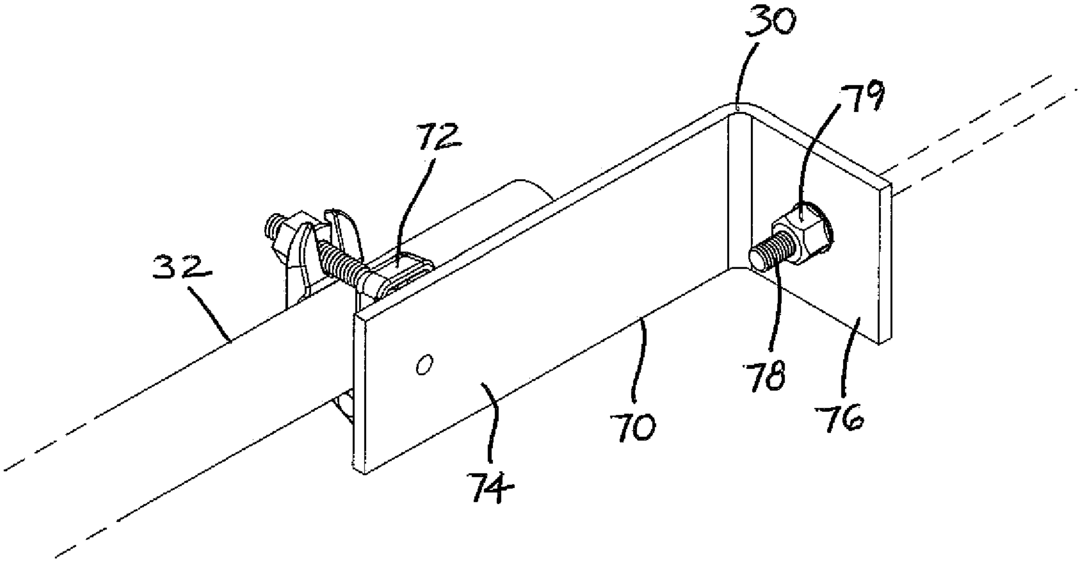
FIG. 4 is a perspective view of a wall tie bracket and clamped tie bracing tube which may be used in the installation of a scaffold, the operational integrity of which may be monitored by the safety devices of the present invention.
Figure 5:
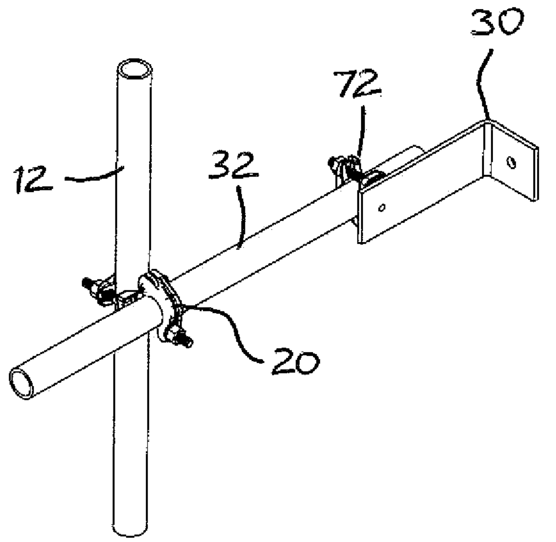
FIG. 5 is a perspective view, from a first angle, of the wall tie bracket and clamped tie bracing tube of FIG. 4 in which the coupler of FIG. 3 is used to couple together the tie bracing tube with a standard of a scaffold.
Figure 6:
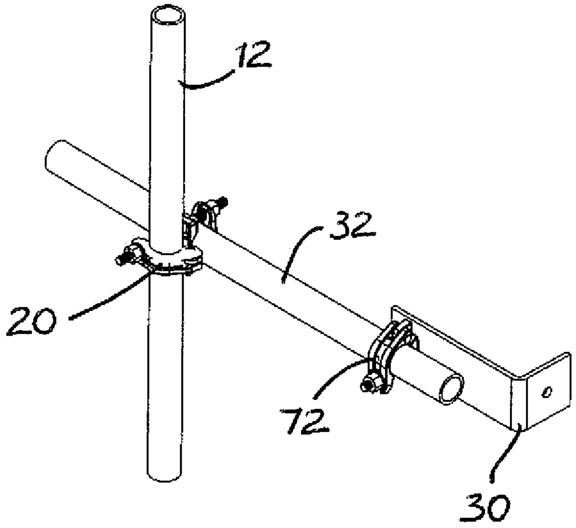
FIG. 6 is a perspective view, from a different angle, of the wall tie bracket and clamped tie bracing tube of FIG. 4 in which the coupler of FIG. 3 is used to couple together the tie bracing tube with a standard of a scaffold.

The coupler 20 shown in FIG. 3 is used to couple together a standard 12 with a tie bracing tube 32 which is clamped to a wall tie bracket 30 (see also FIGS. 4 to 6). The coupler 20 comprises a pair of integrally interconnected scaffold clamps 48, 50. Clamp 48 has a clamp opening 52 for receiving therethrough, say, the standard 12, and clamp 50 has a clamp opening 54 for receiving therethrough the clamped tie bracing tube 32 which crosses at a right angle to the standard 12. Each clamp 48, 50 has a fixed arm 56, 58, respectively, through which the clamps are integrally interconnected, and they each have a pivoting arm 60, 62, respectively, which can each pivot from their respective fixed arm. Each clamp 48, 50 also has a threaded shaft 64 (or bolt) and a tightening nut 66.

The wall tie bracket 30 and clamped tie bracing tube 32 shown in FIG. 4 are used to attach a part of the scaffold 10, 40 to the wall 44. The wall tie bracket 30 has an L-shaped bracket portion 70 and a clamp 72 which is rotatably connected to a long section 74 of the bracket portion 70. A short section 76 of the bracket portion 70 is fixedly secured to the wall 44 by a threaded rod 78 (such as a Booker rod) and a tightening nut 79.

The tie bracing tube 32 is clamped by the clamp 72 to the L-shaped bracket portion 70 of the wall tie bracket 30, and extends in the same direction as the long section 74 away from the wall 44.

The tie bracing tube 32 is shown in FIGS. 5 and 6 coupled together with a standard 12 by means of the coupler 20.

Figure 7:
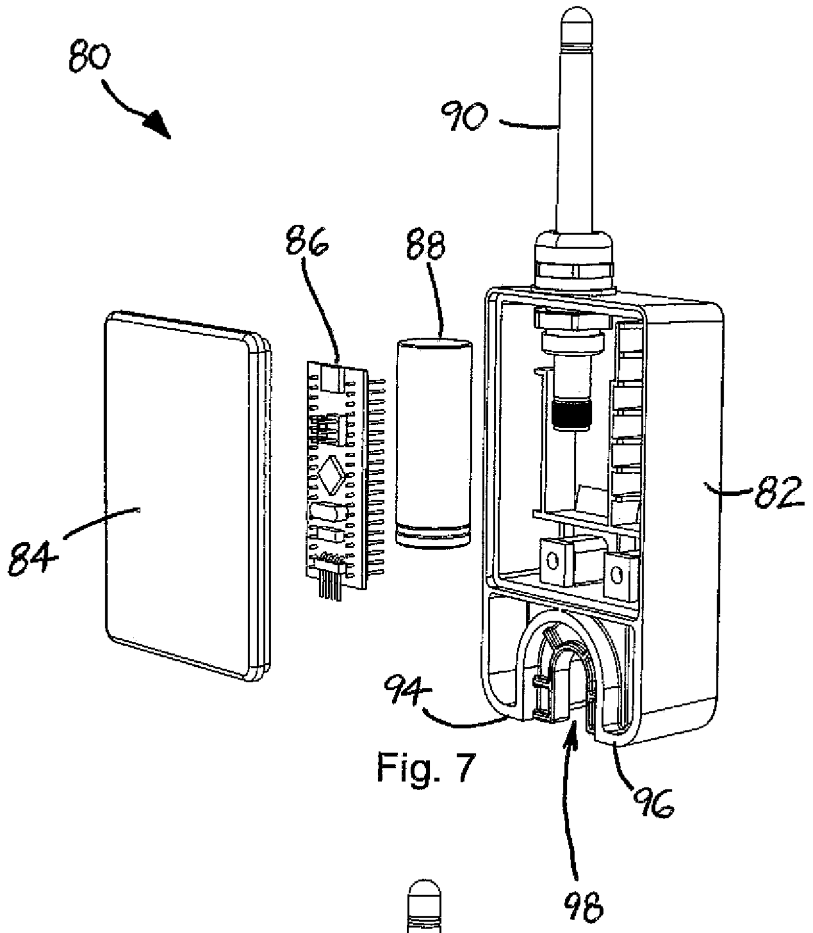
FIG. 7 is an exploded perspective view of a first embodiment of a scaffold safety device of the present invention.
Figure 8:
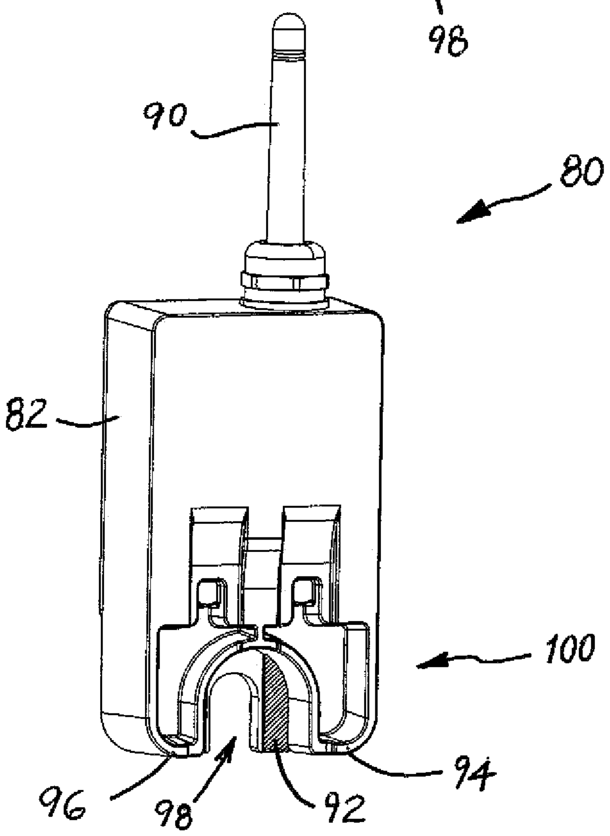
FIG. 8 is a rear perspective view of the scaffold safety device of FIG. 7, when assembled.
Figure 9:
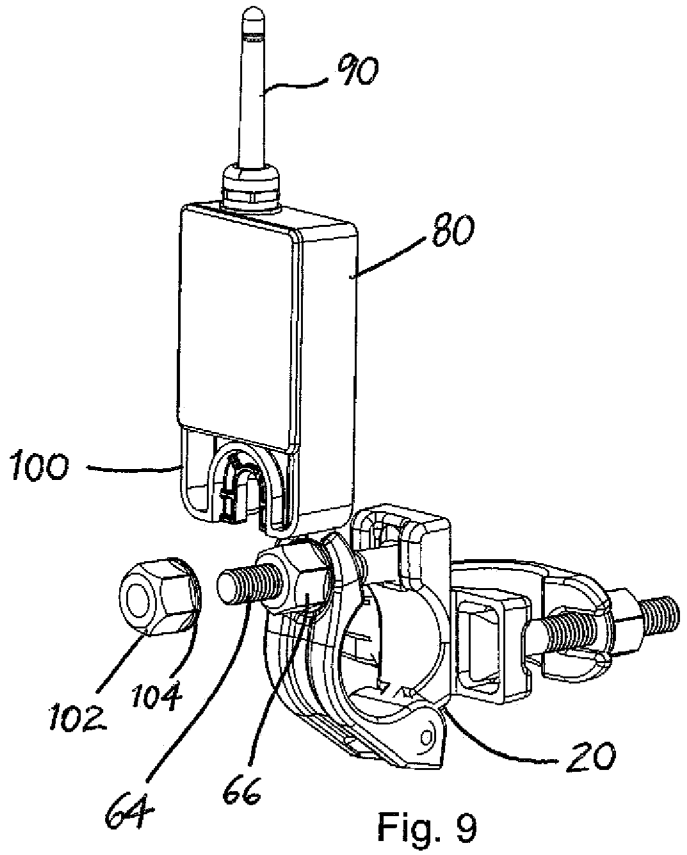
FIG. 9 is a perspective view of the safety device of FIGS. 7 and 8 about to be engaged to the coupler of FIG. 3.
Figure 10:
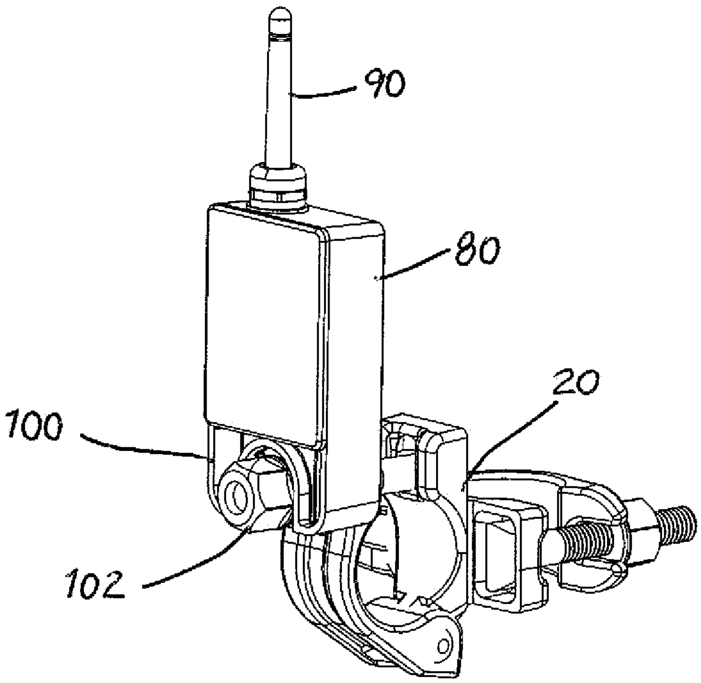
FIG. 10 is a perspective view of the safety device of FIGS. 7 and 8 which has been engaged to the coupler of FIG. 3.
Figure 11:
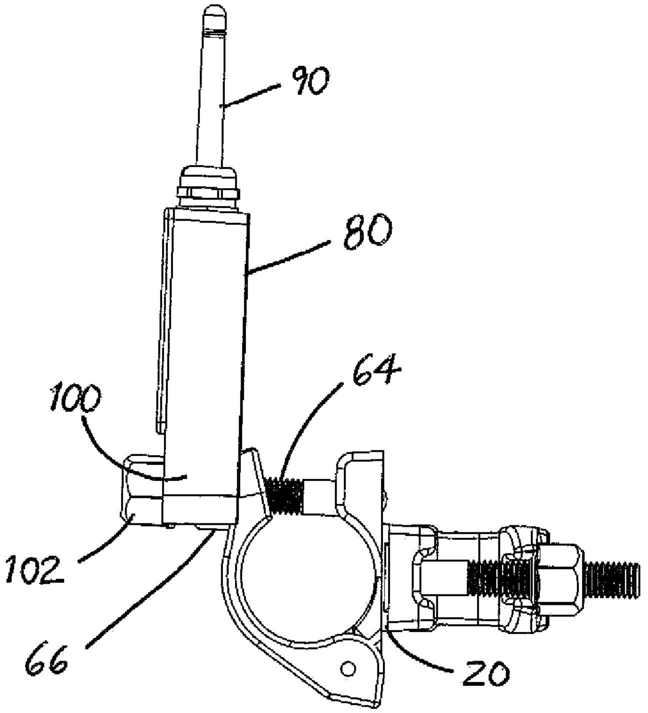
FIG. 11 is a side view of the safety device engaged to the coupler as shown in FIG. 10.
Figure 12:
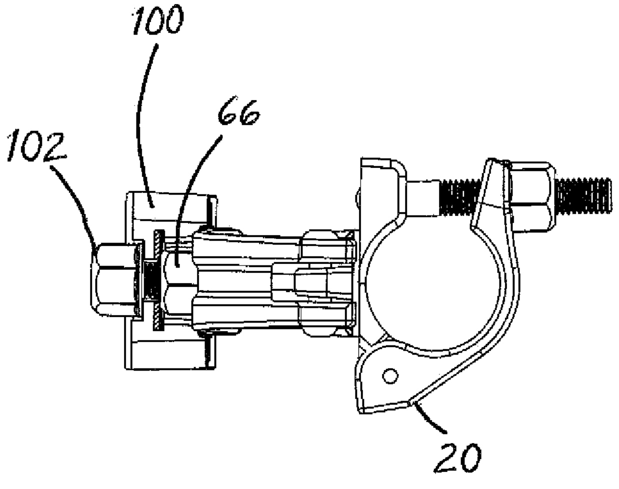
FIG. 12 is a bottom view of the safety device engaged to the coupler as shown in FIG. 10.
Figure 13:
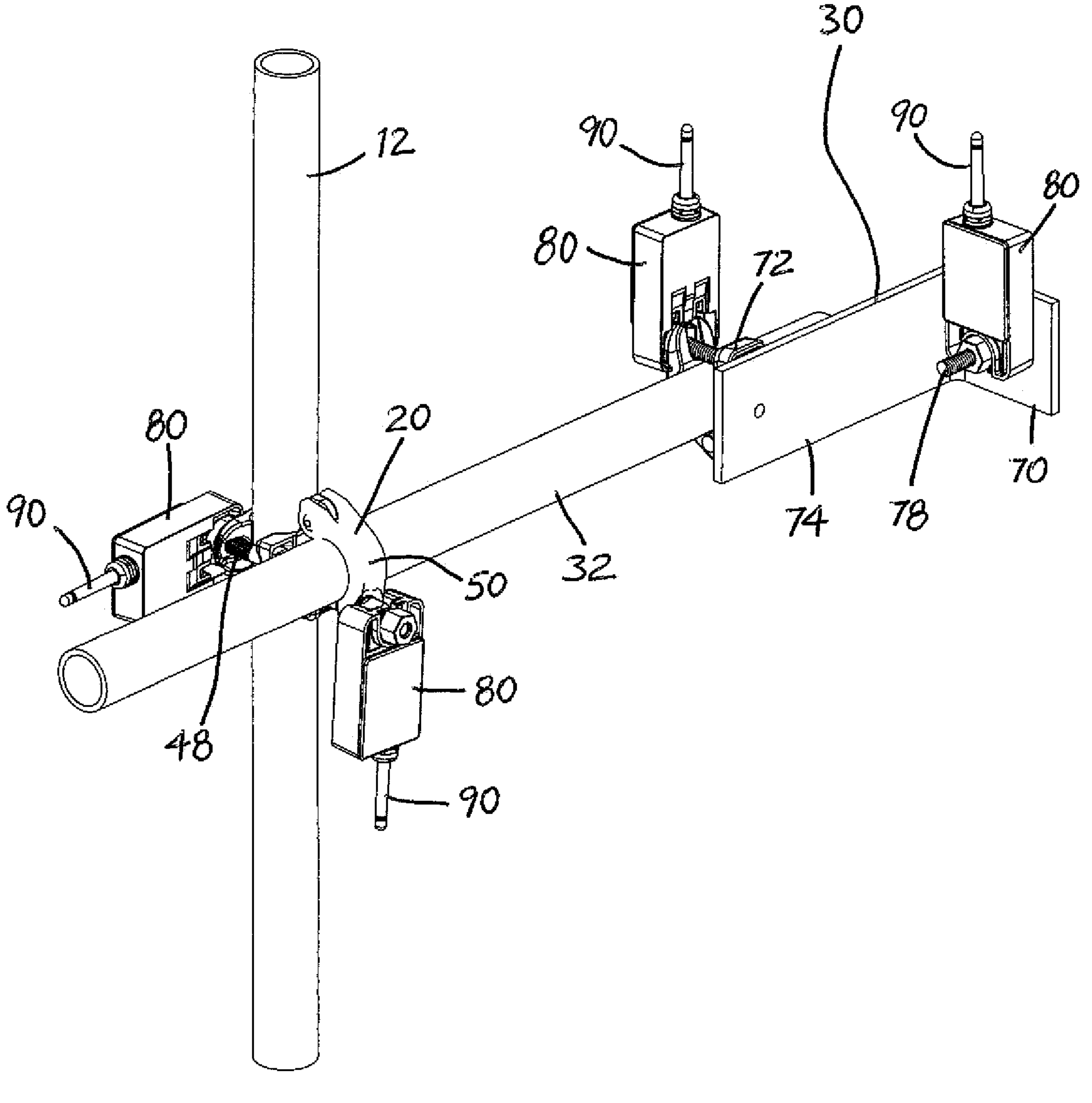
FIG. 13 is a perspective view of a plurality of the scaffold safety devices of FIGS. 7 and 8 which have been engaged to the wall tie bracket and clamped tie bracing tube of the scaffolding section shown in FIGS. 4, 5 and 6.

A first embodiment of a scaffold safety device 80 of the present invention is shown in detail in FIGS. 7 and 8. Its use on a coupler 20 is shown in FIGS. 9 to 12. FIG. 13 shows its multiple uses on a wall tie bracket 30 and clamped tie bracing tube 32 which is coupled together with a standard 12.

The scaffold safety device 80 has a body 82 which houses and protects internal electronic components which are required to operate the scaffold safety monitoring system (to be described in more detail later in this specification). The body 82 has a removable cover 84 for accessing the internal electronic components, namely, a control board 86 (such as a long range board known as a LoRa board), which is powered by a battery 88. The control board 86 is connected to an antenna 90 which can wirelessly transmit an alarm or alert signal initiated when a trigger 92 no longer applies a pressure force against a conventional pressure sensor above a predetermined threshold value.

A pair of arms 94, 96 extend from a main portion of the body 82. The arms 94, 96 are generally parallel and separated by a space 98. The space 98 is sized to receive the threaded shaft 64 of a scaffold clamp 48. The threaded shaft 64 may be suitably extended in length for use with the device 80.

The pair of arms 94, 96 and the main portion of the body 82 located between the arms 94, 96 form a clevis shaped engagement formation 100. Around the inside edge of the clevis shaped engagement formation 100, there is the trigger 92 in the form of a surface associated with a conventional pressure sensor. The trigger 92 is activated by the application of pressure.

As shown in FIGS. 9 to 12, the threaded shaft 64 of the coupler 20 is extended in length to receive thereover the clevis shaped engagement formation 100 of the safety device 80. The engagement formation 100 is located between an inner nut 66 of the coupler 20 and an outer nut 102 with washer 104. When the outer nut 102 with washer 104 are brought into proximity with the inner nut 66, typically by screwing the outer nut 102 towards the body 82, the two nuts 66, 102 apply a pressure force on the trigger 92. The trigger 92 is coupled to a conventional pressure sensor. Once the pressure force sensed by the pressure sensor exceeds a predetermined threshold value, the trigger 92 is activated and the safety device 80 is in a monitoring mode.

If the pressure is subsequently released, the trigger 92 immediately initiates an alarm and the safety device is in an alarm mode. The alarm is typically in the form of an alert signal that is sent, in real time, by way of the antenna 90 to a central monitoring and control computer and/or to a network of distributed computers. However, it will be appreciated that the alarm could be provided in the form of an audible alarm, such as a built-in siren or beeper.

Alternatively, flashing lights or a combination of lights and sound may be generated directly by the safety device 80.

As shown in FIG. 13, a plurality of the safety devices 80 can be used to monitor the operational integrity and safe use of the wall tie bracket 30 and clamped tie bracing tube 32. The coupling together of the tie bracing tube 32 with the standard 12 requires individual safety devices to be deployed on each of the interconnected scaffold clamps 48, 50 of the coupler 20.

In the event of tampering with the safety device 80, such as by unscrewing the outer nut 102 from the shaft 64, the safety device 80 triggers the alarm when the pressure subsequently falls below the predetermined threshold value. In this manner, before triggering the alarm, the safety device 80 (in which the trigger 92 is activated and the safety device is in a monitoring mode) is essentially in an "off" or "sleep" mode when activated, and so the life of the battery 88 is not adversely affected by prolonged periods of no trigger events between site deployments of the safety device 80.

In the embodiment described above, a conventional pressure sensor is used to determine when the outer nut 102 has been released.

However, it will be appreciated that alternative anti-tampering detection means can be deployed. For example, in such an alternative embodiment of the present invention, electrical conductivity sensors which utilize pressure switches, which can open and close a live electrical circuit in response to the application of pressure, may serve as pressure sensors. In relation to the safety device 80, this may be achieved in a slightly modified embodiment thereof in which an electrically conductive sensor (or trigger) detects the presence of the inner and outer nuts 66, 102 by way of an electrical circuit which is completed (or closed) when such a safety device is in the required physical abutment with the nuts. When either of those nuts 66, 102 becomes physically disengaged from the safety device 80, the electrical circuit is opened and the alarm is triggered.

Additional embodiments of scaffold safety devices according to the present invention will be described in detail later in this specification (see FIGS. 16 to 27) which also utilize electrical conductivity sensors in the form of pressure switches.

Figure 14:
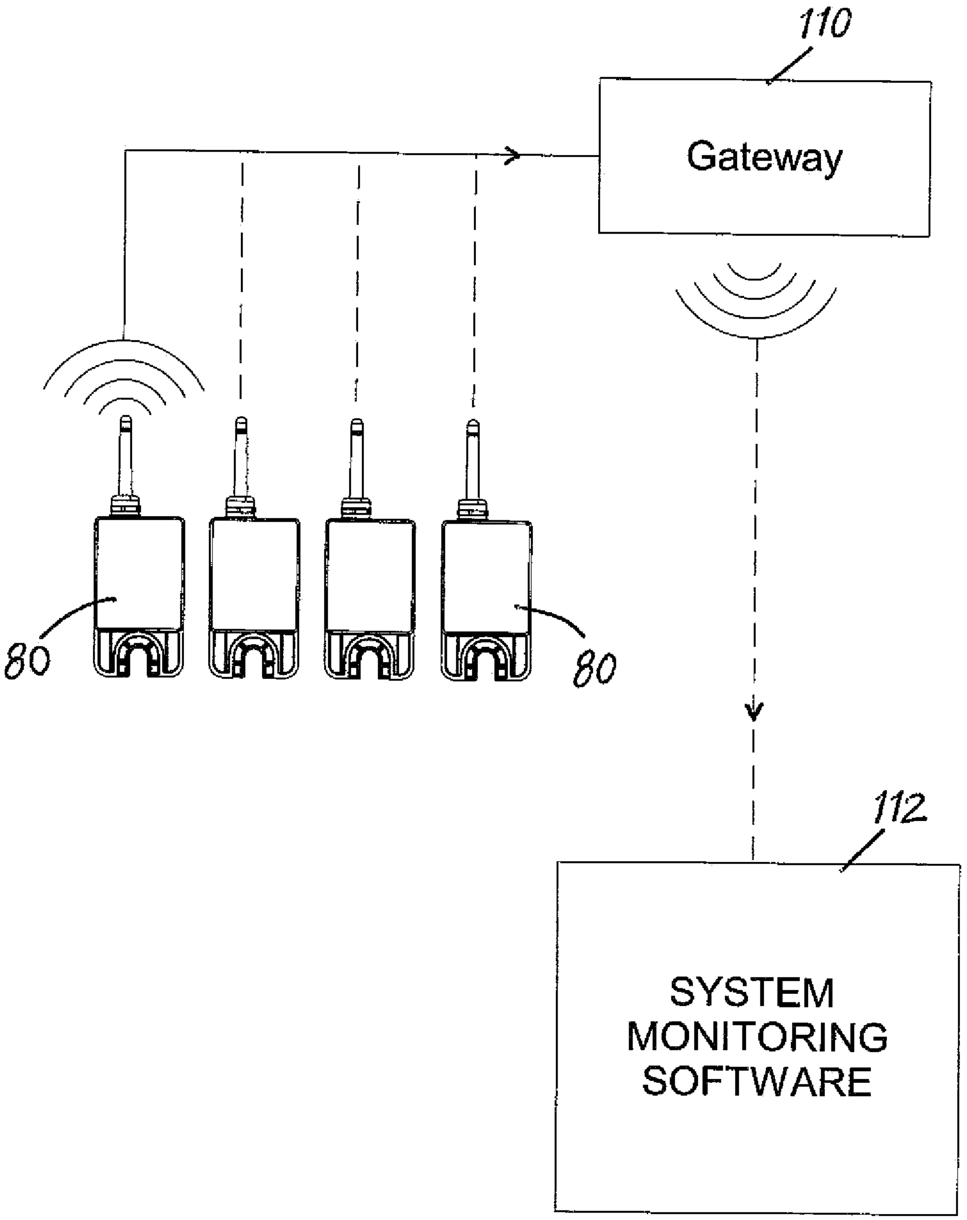
FIG. 14 is a schematic representation of the communication between a plurality of the safety devices of FIGS. 7 and 8 and users of the scaffold safety monitoring system.
Figure 15:
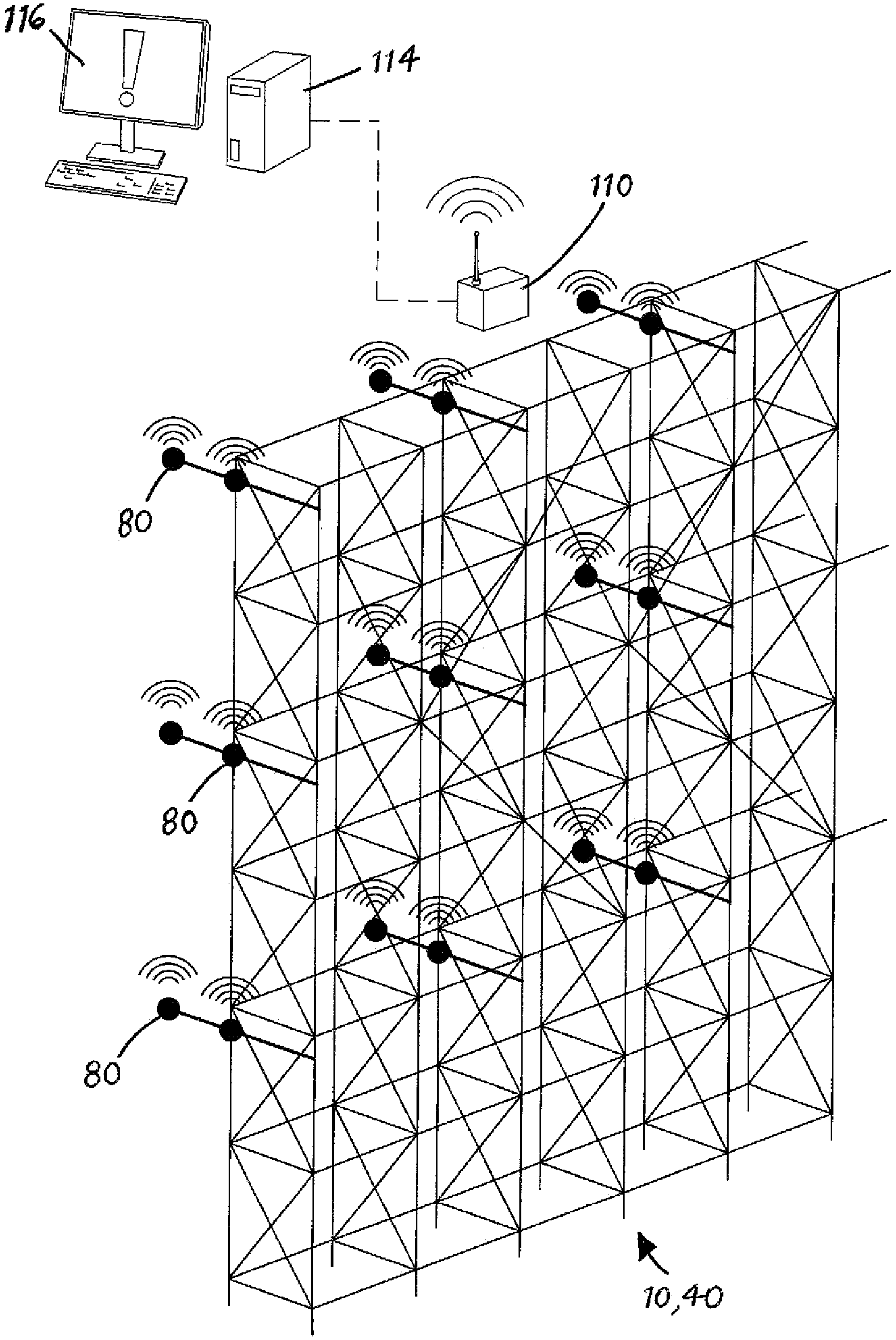
FIG. 15 is a schematic representation of the communication between a plurality of each embodiment of the safety devices according to the present invention and users of the scaffold safety monitoring system.

FIGS. 14 and 15 show schematically how a plurality of the safety devices 80, or any other scaffold safety devices of the present invention, can communicate wirelessly and remotely via a Gateway 110 which is networked to System Monitoring Software 112 operating a central monitoring and control computer 114 and/or a network of distributed computers. Such a Gateway 110 may be a LoRa-based Gateway which can receive and transmit signals over a distance of about 15 kilometres. Communication between a LoRa-based Gateway and the central monitoring and control computer 114 and/or network of distributed computers is via existing Ethernet/Wi-Fi infrastructures or via mobile Internet (eg. 4G, 5G or IOT).

In this way, the safety devices of the present invention 80, 120, 142, 160 and 170 which are deployed on the scaffold 10, 40 can continuously monitor the operational integrity and safe use of the couplers 20, clamps 72, tightened nuts 79 on the threaded rods 78, and any other scaffolding attachment structures which may, such as by unauthorized unscrewing of a nut, be tampered with, and which may cause critical scaffold failures.

The safety devices of the present invention provide feedback wirelessly via the Gateway 110. Information received by the designated safety supervisor may be represented on a Dashboard-Graphic User Interface (GUI) 116 of a remotely located, central monitoring and control computer and/or of a network of distributed computers. Such computers may include conventional desktop or laptop computers, smart phones and similar devices suitable for off-site monitoring and management of the safe use of the scaffold.

When a scaffold safety device of the present invention is in an alarm mode, an alert message or other alarm signal is immediately transmitted via the Gateway 110 to the Dashboard-GUI 116 indicating a trigger event or safety breach, and an email or SMS (text message) notification is sent to the designated safety supervisor and/or to a hierarchical chain of command. Even after the initial alarm signal has been received, the other safety devices on the scaffold continue in their monitoring mode and may communicate with one another to ensure the operational integrity of all other scaffolding attachment structures on the scaffold. The safety device in the alarm mode continues to send alarm signals, either continuously or periodically, until the safety breach has been resolved and the safety device redeployed to a monitoring mode.

In the case of safety device 80, the trigger 92 is ideally reactivated (for the safety device to again assume the monitoring mode) by a person attending the site of the safety breach and manually redeploying the safety device 80 between the two nuts 66, 102. Alternatively, the safety device 80 may first need to be reset remotely by a computer before it can be redeployed. Alternatively, the safety device 80 may be provided with a reset button.

The alarm signal which is sent when a trigger event occurs is logged remotely by the computer network. This allows information regarding the trigger event to be recorded for subsequent analysis. For example, the incidence of an alarm being triggered and the name of the site manager who was working at that time may be recorded for subsequent data analytics. Similarly, data regarding the number of trigger events occurring on any given construction site can be compared to that of another site over a period of time to assess the number of safety breaches generated by a given team of site workers.

The capturing and recording of data relating to trigger events is useful for the purpose of documenting unsafe practices, and quickly identifying the location of the breach and the person responsible for the breach. Because the alarm is triggered in real time as the nuts 66, 102 are decoupled from the trigger 92, it is normally possible to identify the person responsible immediately, and this acts as a strong deterrent to tampering with the safety devices.

The System Monitoring Software 112 may be used to collect and display in real time the aforementioned data, statistics and other information for continuous safety management. Among the information which may be displayed on the Dashboard-GUI 116 is a graphical representation (in two or three dimensions) of the scaffold showing the location and mode (or operational condition) of all the safety devices deployed on the scaffold.

Figure 16:
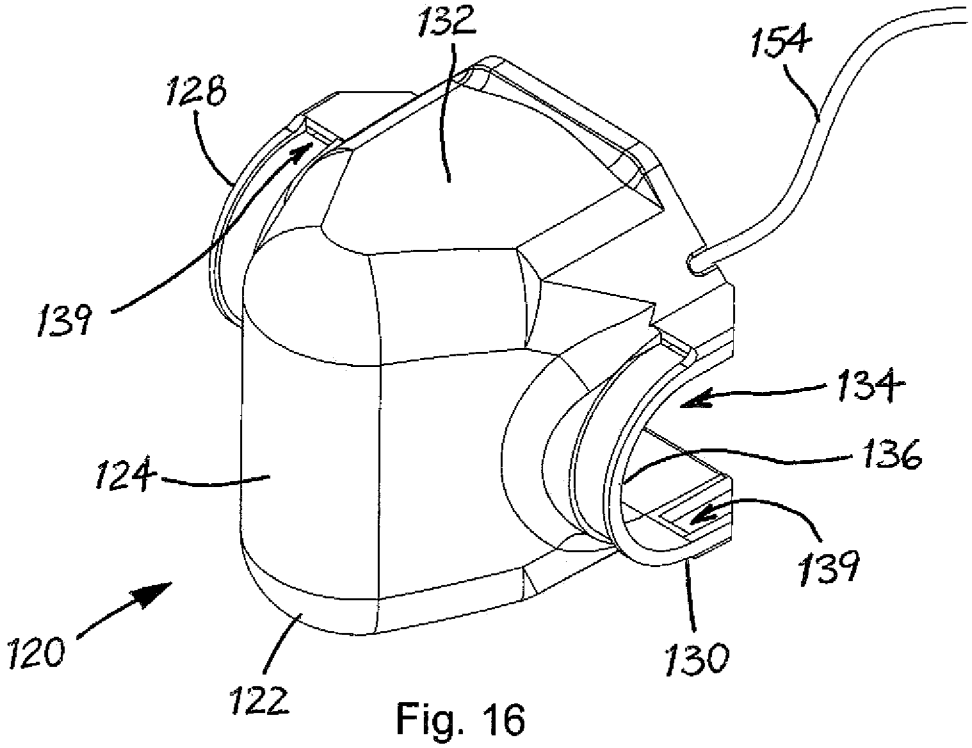
FIG. 16 is a perspective view of a second embodiment of a scaffold safety device of the present invention.
Figure 16A:
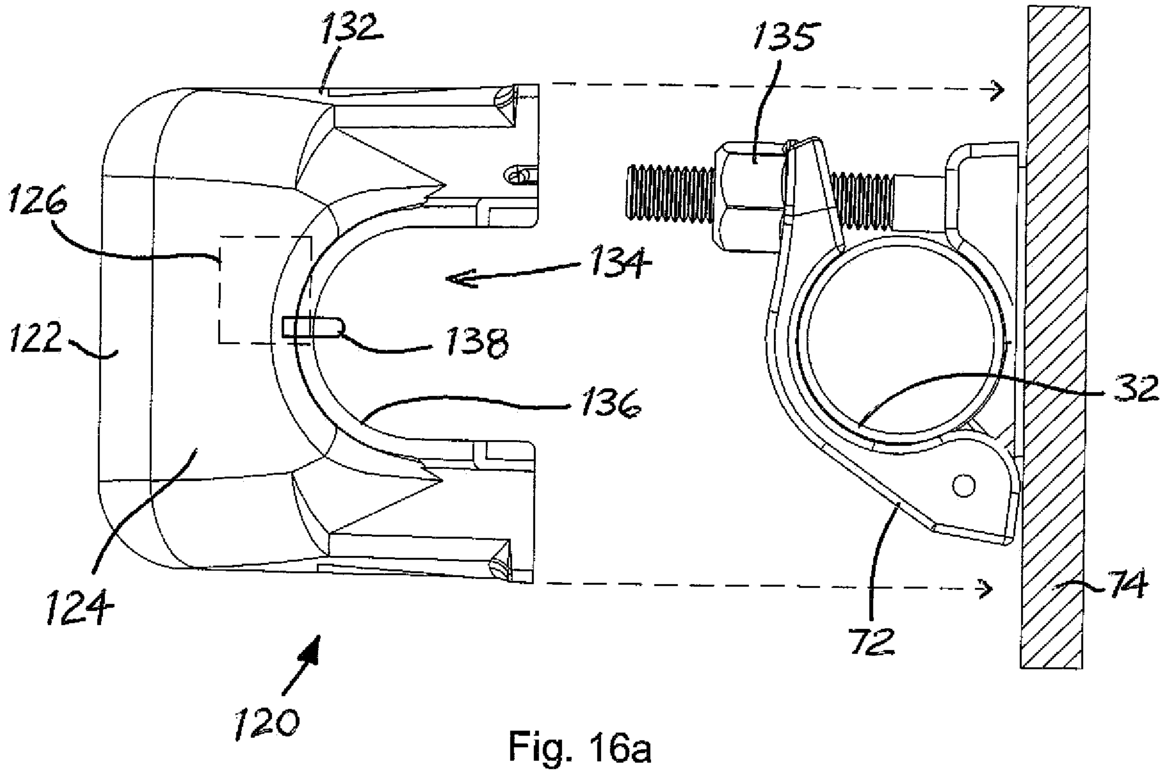
FIG. 16*a* is a right side view of the safety device of FIG. 16 about to be engaged to a clamp which attaches the wall tie bracket to the tie bracing tube as shown in FIG. 4.
Figure 16B:
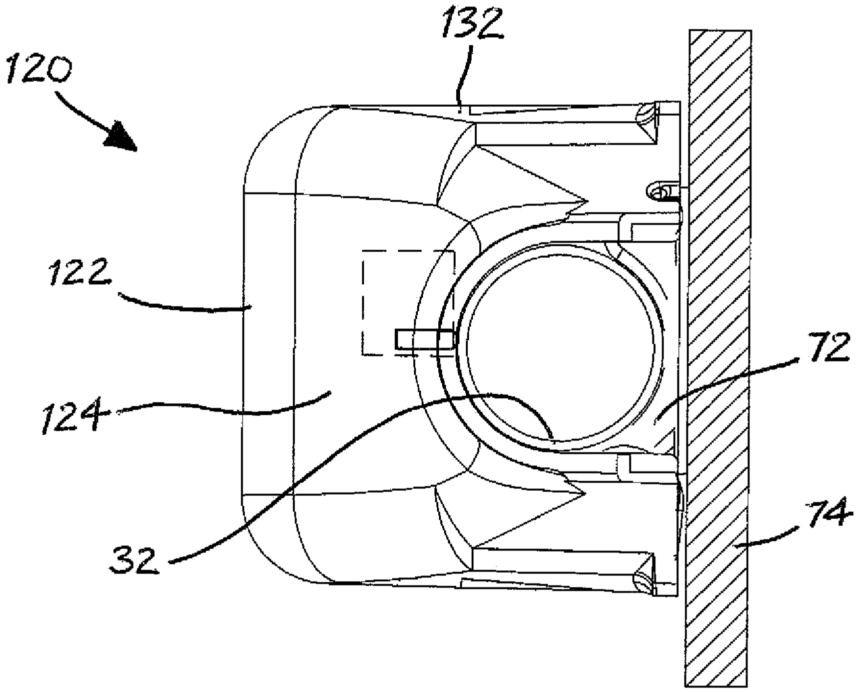
FIG. 16*b* is a right side view of the safety device of FIG. 16 which has been engaged to the clamp shown in FIG. 16*a*.

The scaffold safety device 120 shown in detail in FIGS. 16, 16*a* and 16*b* is a preferred embodiment of the present invention. It has a body 122 which includes an engagement formation 124 that is configured to engage with a scaffolding attachment structure of a scaffold 10, 40. It also has a pressure sensor 126 which is configured to detect when the body 122 is disengaged from the scaffolding attachment structure.

The pressure sensor 126 is in the form of an electrical circuit (on a circuit board powered by a battery and housed in a protective module within the body 122) along which a current will pass when a pushbutton pressure switch 138 is depressed (when the safety device 120 is in a monitoring mode) or a current will not pass when the pushbutton pressure switch 138 is released and extended (when the safety device 120 is in an alarm mode). The pressure required to operate such an electrical conductivity sensor is that which is applied by an electrically conductive element of the pushbutton pressure switch 138. Therefore, the trigger for the pressure sensor 126 is the pushbutton pressure switch 138. In a trigger event (such as when the safety device 120 is lifted from the scaffolding attachment structure), the pushbutton pressure switch 138 moves from its depressed position to its extended position, whereby the electrically conductive element is no longer pressed against the opposing switch terminals of the circuit (which now constitutes a gap along the circuit), to open (or break) the circuit. An opened circuit triggers an alarm signal.

The engagement formation 124 has a pair of arms 128, 130 which extend in opposite directions away from a central portion 132 of the body 122. The arms 128, 130 are separated by a clearance or cavity 134 of the central portion 132. The cavity 134 is configured to receive therewithin at least a threaded rod with its tightened nut of the scaffolding attachment structure which, in this instance, is a coupler 20 or a clamp 72.

As shown in FIGS. 16*a* and 16*b*, the entire clamp 72, including its threaded shaft and tightened nut, is fully covered by the central portion 132 of the body 122.

The pushbutton pressure switch 138 is specifically located on a selected one of the arms 128, 130, which in this case is arm 128, and its accompanying pressure sensor 126 is configured to detect when a pressure is released (and therefore is below a predetermined threshold value). In this preferred embodiment, as described above, the predetermined threshold value is any pressure (non-zero) applied by the electrically conductive element of the pushbutton pressure switch when (in the monitoring mode) it presses (against the force of a spring) against the opposing switch terminals of the circuit.

In an alternative embodiment, the pushbutton pressure switch and pressure sensor may be located on the wall of the cavity 134.

Figure 26:
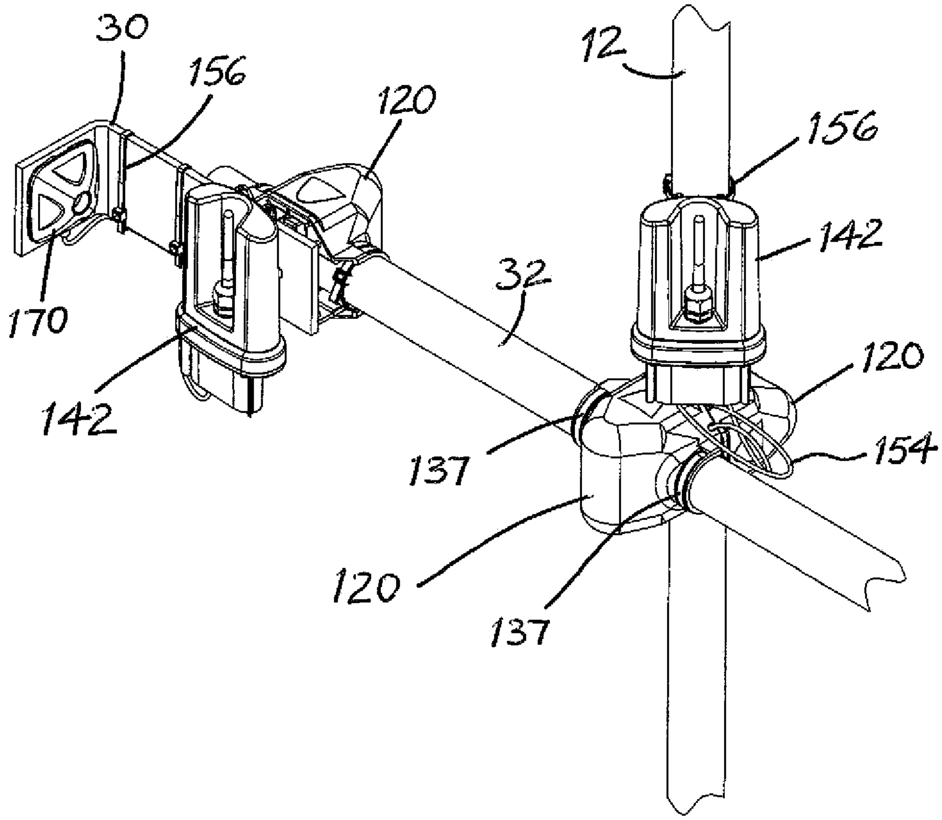
FIG. 26 is a perspective view of a plurality of the scaffold safety devices of FIGS. 16 to 22 which have been engaged to the wall tie bracket and clamped tie bracing tube of the scaffolding section shown in FIGS. 4, 5 and 6.
Figure 27:
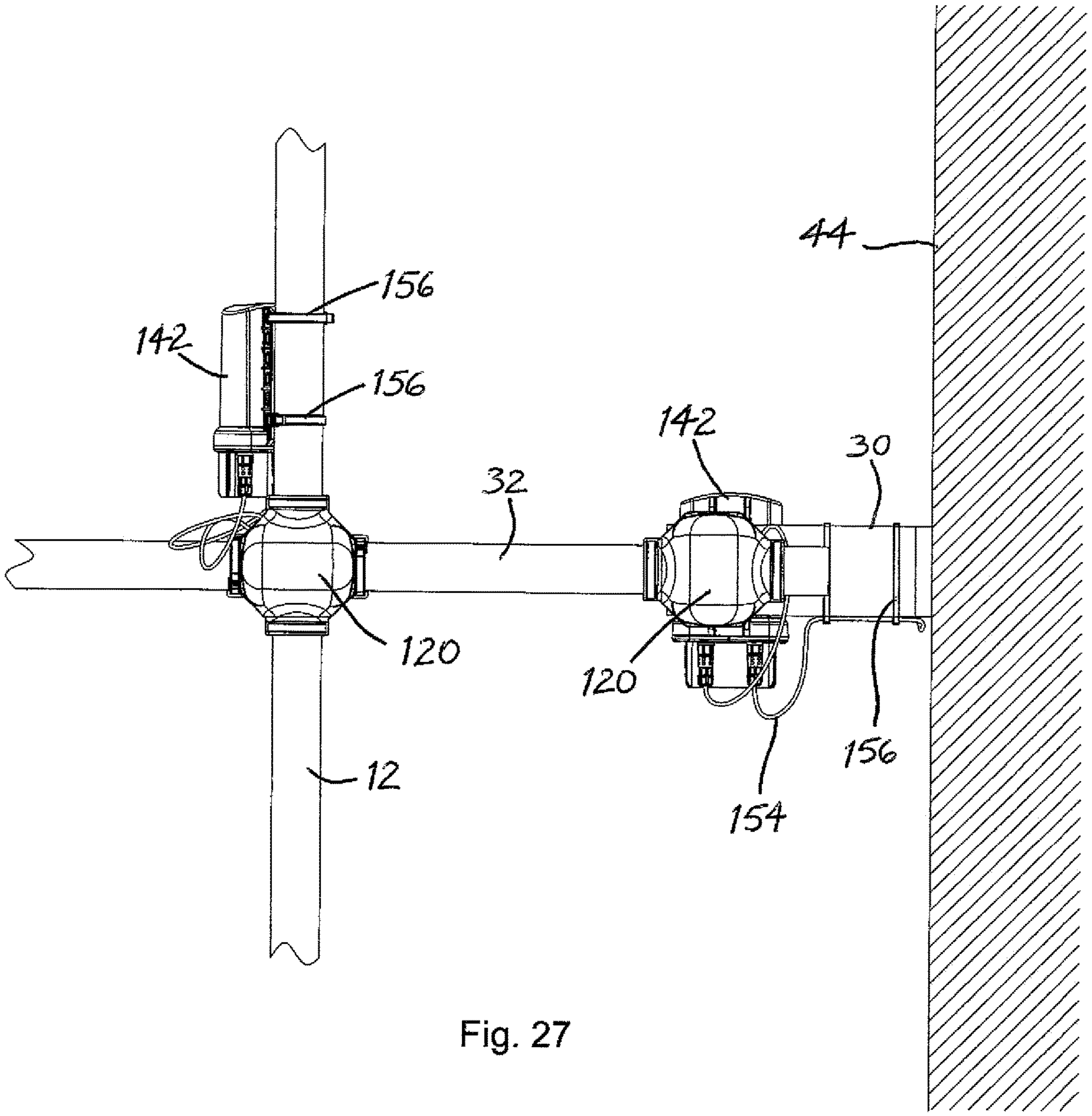
FIG. 27 is a side view of the arrangement shown in FIG. 26 attached to a wall of a building under construction.

The arms 128, 130 are each configured to have a substantially semi-circular interior surface 136 or depression which can be snugly fitted or nested around an exterior surface portion of a scaffold tube, such as a standard 12 or a tie bracing tube 32 (see FIGS. 26 and 27).

After being so fitted, cable ties 137 can be passed through outer holes 139 in the arms 128, 130 and around the scaffold tube to secure the safety device 120 in place.

The pressure sensor 126 is in communication with a control board 86 which is connected to an antenna 140 for transmitting signals to a central monitoring and control computer and/or to a network of distributed computers for the purposes described earlier in relation to safety device 80.

Figure 20:
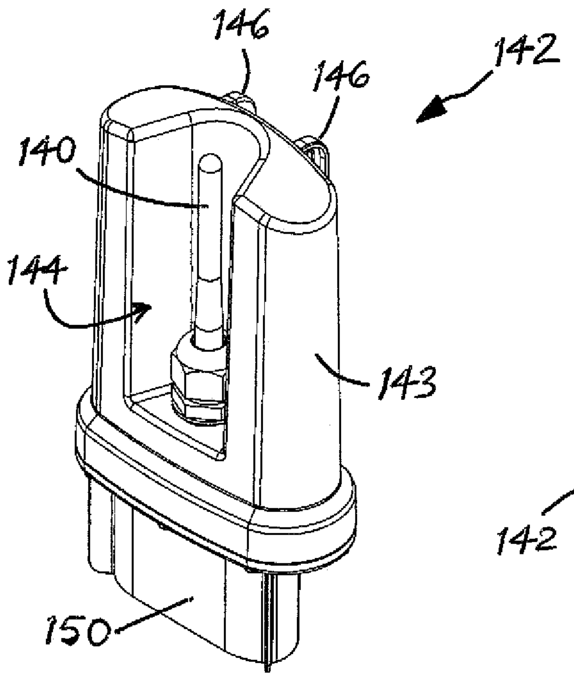
FIG. 20 is a perspective view of a secondary scaffold safety device on which is mounted an antenna for communicating with the scaffold safety devices of the second, third and fourth embodiments.
Figure 21:
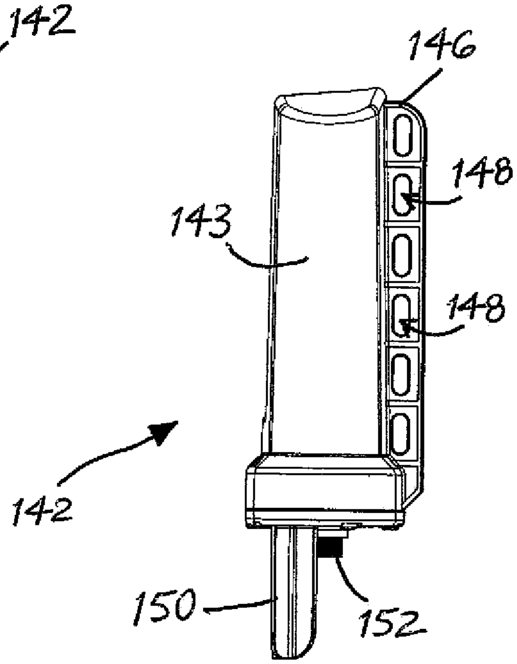
FIG. 21 is a right side view of the secondary scaffold safety device of FIG. 20.
Figure 22:
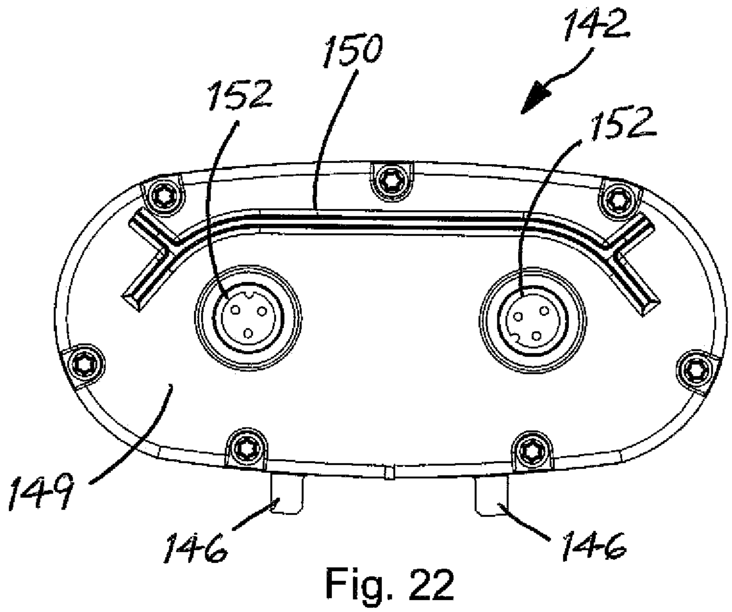
FIG. 22 is a bottom view of the secondary scaffold safety device of FIG. 20.

In this preferred embodiment, the control board and antenna are mounted on a separate, secondary scaffold safety device 142, as shown in FIGS. 20 to 22. The secondary safety device 142 has a main body 143 which is configured so as to partly house and protect the antenna 140 in an outwardly facing concavity 144. The rear of the secondary safety device 142 has a pair of parallel, spaced apart projections 146 through which holes 148 are formed. At the base 149 of the secondary safety device 142 is a descending skirt or protective shroud 150. Behind the shroud 150 is a pair of sockets 152 for receiving respective plugs at the end of an electrical cable 154 from the pressure sensor 126 of the safety device 120.

A plurality of the secondary safety devices 142 are fitted into position against the wall tie bracket 30 and against the standard 12 proximal to the locations of their corresponding safety devices 120, 170, as shown in FIGS. 26 and 27. In these positions, cable ties 156 are passed selectively through respective pairs of height-corresponding holes 148 of the rear projections 146 of the devices 142 and around the wall tie bracket 30 and the standard 12 to secure the secondary safety devices 142 in place.

Figure 17:
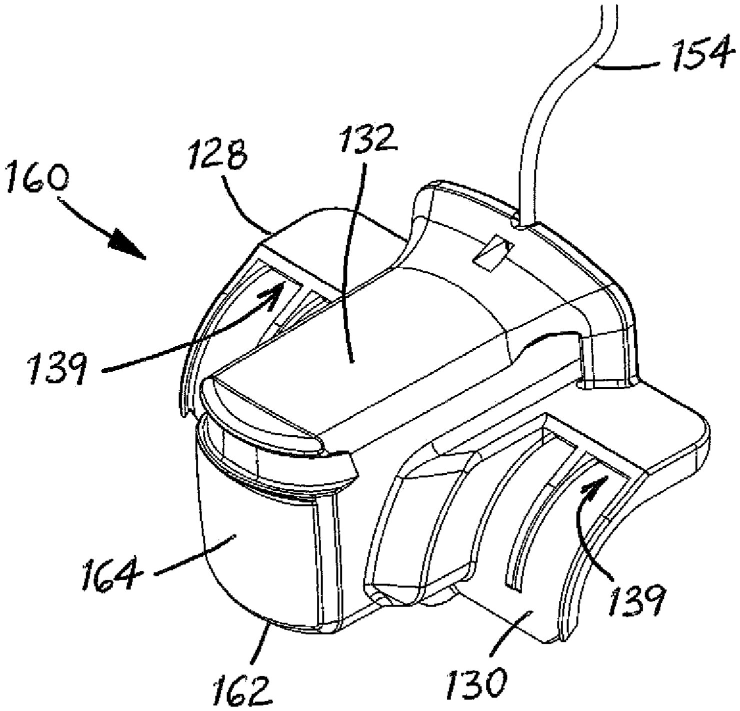
FIG. 17 is a perspective view of a third embodiment of a scaffold safety device of the present invention.
Figure 17A:
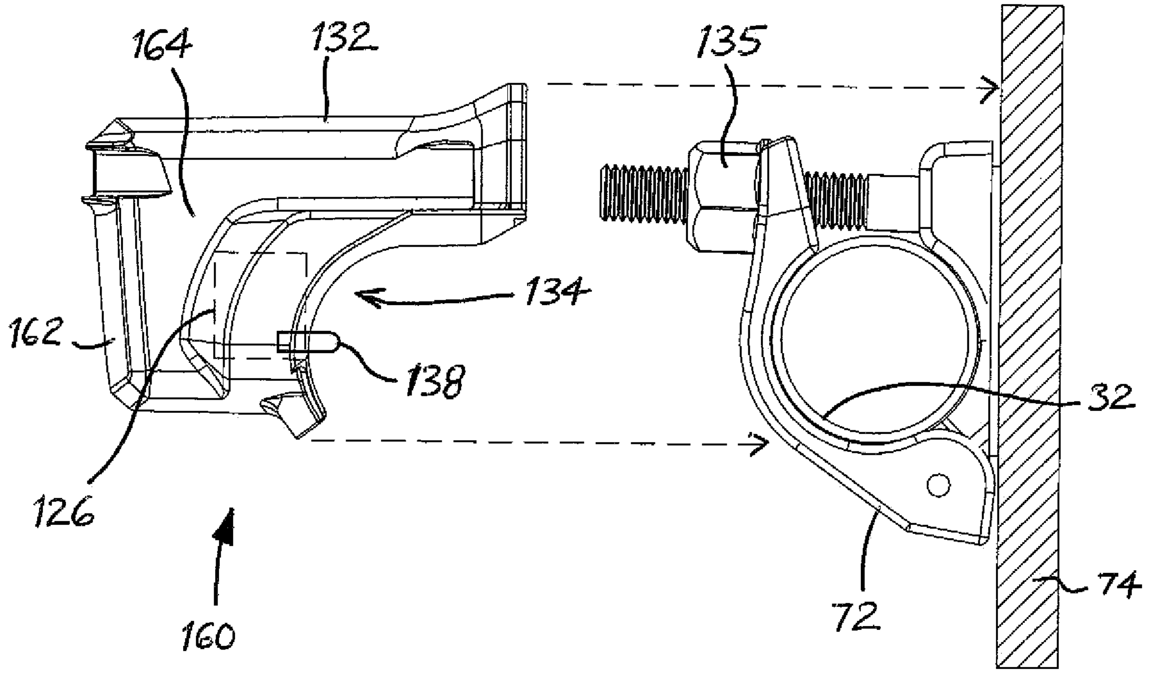
FIG. 17*a* is a right side view of the safety device of FIG. 17 about to be engaged to a clamp which attaches the wall tie bracket to the tie bracing tube as shown in FIG. 4.
Figure 17B:
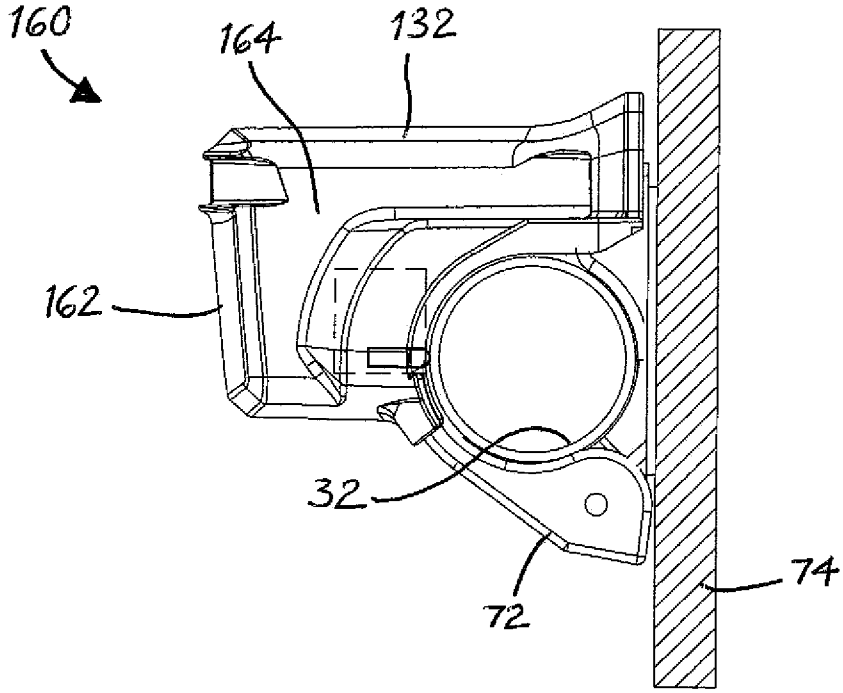
FIG. 17*b* is a right side view of the safety device of FIG. 17 which has been engaged to the clamp shown in FIG. 17*a*.

The scaffold safety device 160 shown in detail in FIGS. 17, 17*a* and 17*b* is another embodiment of the present invention. It has a body 162 which includes an engagement formation 164 with a narrower profile than that of the safety device 120 (as can be seen by comparing FIG. 17*a* with FIG. 16*a*) and so does not cover the entire clamp 72. However, importantly it does fully cover the threaded shaft and its tightened nut 135.

The scaffold safety device 160 has a pressure sensor 126 and a pushbutton pressure switch 138 which are substantially identical to those of the safety device 120 and are configured to detect when the body 162 is disengaged from the clamp 72. It also has some other features which are substantially identical or at least similar to features of the safety device 120. Accordingly, for ease of reference, like features are shown in FIGS. 17, 17*a* and 17*b* by reference to like numerals.

Figure 18:
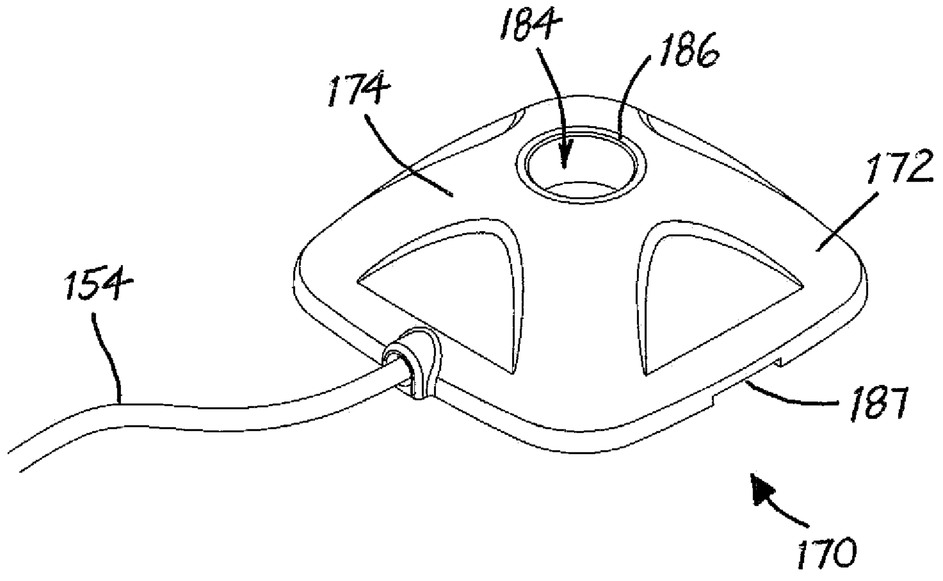
FIG. 18 is a top perspective view of a fourth embodiment of a scaffold safety device of the present invention.
Figure 19:
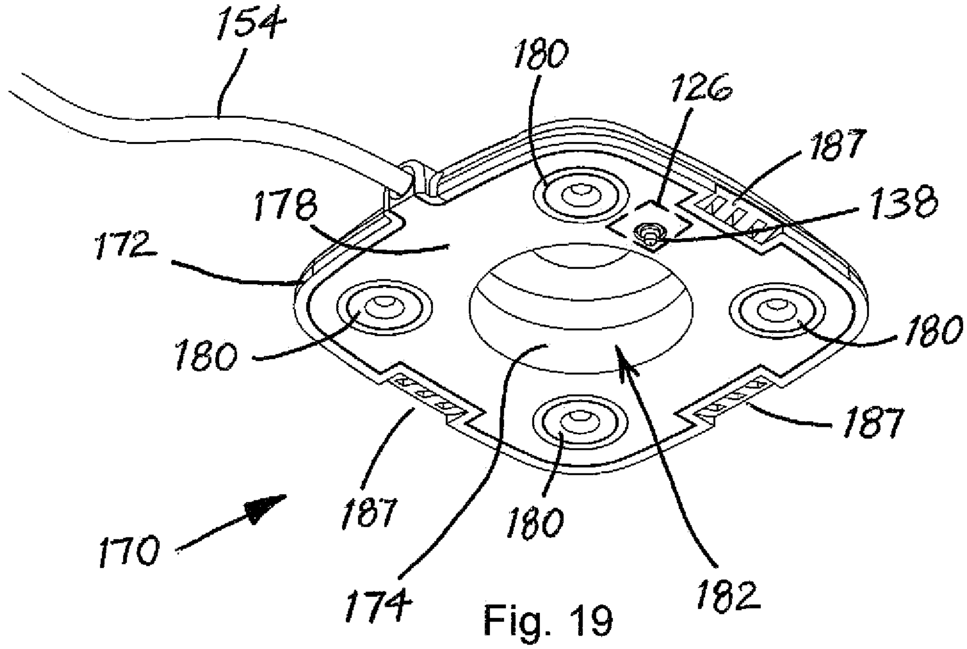
FIG. 19 is a bottom perspective view of the scaffold safety device of FIG. 18.

The scaffold safety device 170 shown in detail in FIGS. 18 and 19 is yet another embodiment of the present invention. It has a body 172 which includes an engagement formation 174 which is configured to engage with a threaded rod 78 and its tightened nut 80 used to attach a wall tie bracket 30 to an external wall of a building structure under construction. It also has a pressure sensor 126 and a pushbutton pressure switch 138 which are substantially identical to those of the safety device 120 and are configured to detect when the body 172 is disengaged from the wall tie bracket 30. The scaffold safety device 170 therefore serves exclusively (along with its corresponding secondary scaffold safety device 142) to monitor and communicate any unauthorized tampering with a wall tie bracket 30.

The wall tie bracket 30, as shown in FIG. 4, is made of steel, which is a magnetic material. At the underside 178 of the safety device 170 are four disc magnets 180 which provide a strong force of attraction to the wall tie bracket 30. Centrally located in the underside 178 is a cylindrical aperture or cavity 182 which is sized to receive and fully cover the nut 80. At the top of the cavity 182 is a narrower opening 184 to the roof 186 of the body 172. The threaded rod 78 is able to pass through the opening 184. There are rebates 187 formed partly along three lower edges of the safety device 170. When required, the rebates 187 allow an authorized person to insert the tip of a screwdriver or similar tool into a selected rebate and wedge the safety device 170 up from the bracket 30.

The pressure sensor 126 and pushbutton pressure switch 138 are located on the underside of the safety device 170 and are configured to detect any unauthorized removal of the pressure sensor from the bracket 30. As described in detail earlier, the trigger for the pressure sensor 126 is the pushbutton pressure switch 138 which extends downwardly from the underside 178.

In a trigger event (such as when the safety device 170 is lifted from the bracket 30, the pushbutton pressure switch 138 moves from its depressed position to its extended position, whereby the electrically conductive element is no longer pressed against the opposing switch terminals of the circuit (which now constitutes a gap along the circuit), to open (or break) the circuit. An opened circuit triggers an alarm signal.

The pressure sensor 126 is configured to detect when a pressure is released (and therefore is below a predetermined threshold value). In this preferred embodiment, as described above, the predetermined threshold value is any pressure (non-zero) applied by the electrically conductive element of the pushbutton pressure switch when (in the monitoring mode) it presses (against the force of a spring) against the opposing switch terminals of the circuit.

The safety device 170 communicates via the electrical cable 154 with a secondary safety device 142 on which a control board 86 and antenna 140 are operatively mounted. Any alarm signals are transmitted via the antenna 140 to a central monitoring and control computer and/or to a network of distributed computers for the purposes described earlier in relation to safety devices 80, 120 and 160.

Figure 23:
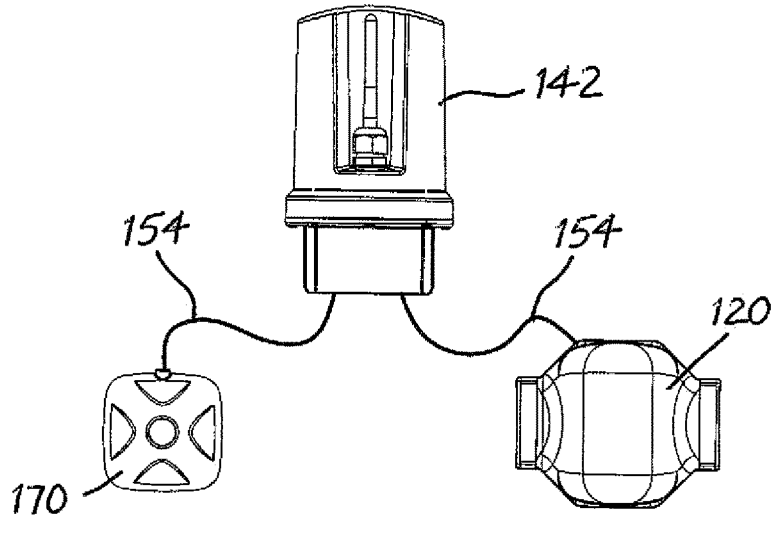
FIG. 23 is a first possible combination of two safety devices selected from the second, third and fourth embodiments which can be connected to communicate with a single secondary scaffold safety device of FIGS. 20 to 22.
Figure 24:
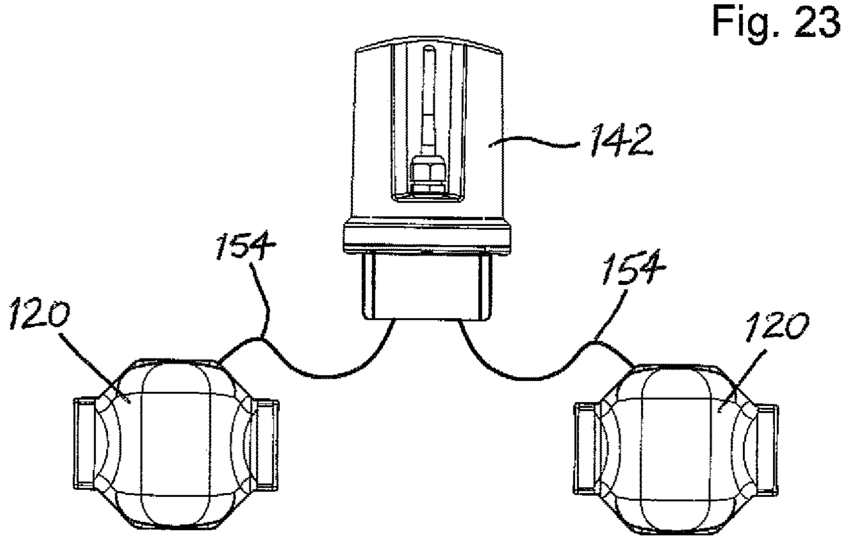
FIG. 24 is a second possible combination of two safety devices selected from the second, third and fourth embodiments which can be connected to communicate with a single secondary scaffold safety device of FIGS. 20 to 22.
Figure 25:
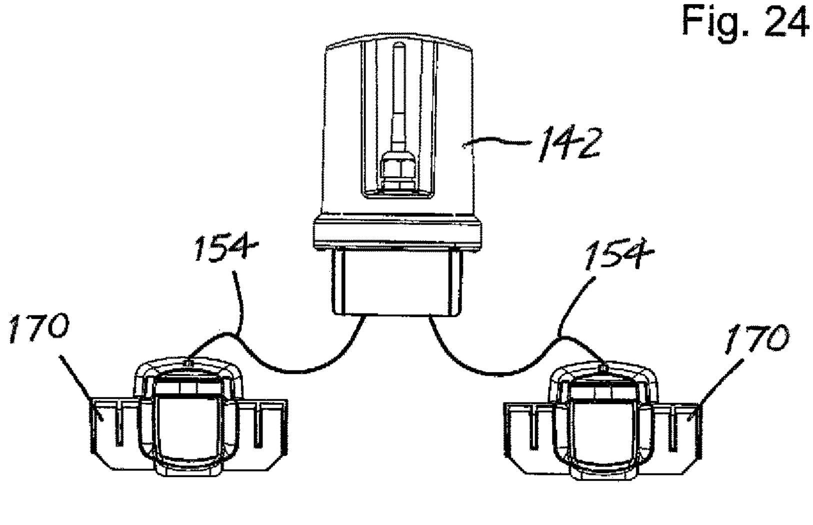
FIG. 25 is a third possible combination of two safety devices selected from the second, third and fourth embodiments which can be connected to communicate with a single secondary scaffold safety device of FIGS. 20 to 22.

FIGS. 23 to 25 show that any combination of two safety devices selected from the safety devices 120, 160 and 170 can be connected to communicate with a control board 86 and antenna 140 of a secondary safety device 142. As will be appreciated by persons skilled in this art, the arrangements shown in FIGS. 23 to 25 are not exhaustive.

FIGS. 26 and 27, to which references were made earlier in this specification, show various physical arrangements for mounting the safety devices 120 and 170 and the secondary safety device 142 to a wall tie structure of a scaffold.

It will also be readily appreciated by persons skilled in this art, upon reading this description of embodiments of the invention, that there may be alternative embodiments of safety devices for a scaffold which fall within the scope of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. A scaffold safety device comprising a body having an engagement means configured to engage with an element of a scaffold assembly, and a sensor configured to detect when the body is disengaged from the scaffold assembly;

wherein the engagement means includes first and second arms extending away from the body, the arms being separated by a clearance, the clearance being configured to receive a threaded rod and a tightening nut of the scaffold assembly;

wherein the sensor is a pressure sensor, and at least one of the first arm, the second arm and a portion of the body located between the arms, include the pressure sensor which is configured to detect when a pressure attains a predetermined threshold value;

wherein the pressure sensor is included in the first arm.

2. The scaffold safety device of claim 1 wherein the pressure sensor is in communication with a control board which is connected to an antenna.

3. The scaffold safety device of claim 2 wherein the control board is powered by a battery.

4. The scaffold safety device of claim 1 wherein a depression is formed in a side of the body for nesting against and receiving a portion of the scaffold assembly.

5. The scaffold safety device of claim 1 wherein the pressure sensor is an electrical conductivity sensor.

6. The scaffold safety device of claim 2 wherein the electrical conductivity sensor cooperates with a pushbutton pressure switch.

7. A method of using the scaffold safety device of claim 1 to detect tampering with a scaffold assembly, the method including the steps of:

locating the scaffold safety device over the threaded rod and tightened nut of the scaffold assembly, activating a trigger of the device by pressing the pressure sensor against a structural element of the scaffold assembly, the structural element being located on or adjacent to the threaded rod and tightened nut, and activating an alarm if the pressure sensed by the pressure sensor attains a predetermined threshold value.

8. The method of claim 7, further including the step of sending one or more electronic messages by at least one of SMS notification and email to one or more recipients recorded in a database in response to the pressure sensed by the pressure sensor attaining the predetermined threshold value.

* * * * *